2,864,860

MANUFACTURE OF TEREPHTHALIC ACID

John F. Walker, Wilmington, Del., assignor to Hercules Powder Company, Wilmington, Del., a corporation of Delaware No Drawing. Application March 4, 1957
Serial No. 643,491

4 Claims. (Cl. 260—515)

The present invention relates to an improvement in the manufacture of terephthalic acid.

There has recently been devised a process for the manufacture of terephthalic acid which is a practical utilization of the discovery that an alkali metal salt of benzoic acid, orthophthalic acid, or isophthalic acid can be transformed by heating at a relatively elevated temperature into the corresponding alkali metal salt of terephthalic acid. This method and its various modifications are described, among other publications, in Australian Patent No. 163,524; Belgium Patents 522,829; 524,035; 533,755; U. S. patent applications, Serial Nos. 392,512, filed November 16, 1953, now abandoned; 395,609, filed December 1, 1953, now abandoned; 449,266, filed August 11, 1954, now abandoned; and 472,245, filed November 30, 1954; now abandoned by Bernhard Raecke; and in U. S. patent applications, Serial Nos. 472,246, filed November 30, 1954; now U. S. Patent No. 2,794,830 and 480,620, filed January 7, 1955 by Bernhard Raecke et al.

Still more recently, the above process has been extended to the manufacture of terephthalic acid from benzene carboxylic acids having three or more carboxyl groups. In U. S. patent application, Serial No. 582,087, by Schenk et al., filed May 2, 1956, for example, there is described the manufacture of terephthalic acid by a process which comprises heating an alkali metal salt of such acids as hemi-mellitic acid, trimellitic acid, trimesitinic acid, mellophanic acid, prehnitic acid, pyromellitic acid, benzene pentacarboxylic acid, and mellitic acid, as well as mixtures of such salts with themselves or with alkali metal salts of benzoic acid in the presence of a catalyst.

Summarizing briefly the prior art as above described, there is proposed a process for the manufacture of terephthalic acid in which the starting material is an alkali metal salt of a benzene carboxylic acid other than terephthalic acid. The alkali metal salts that can be used are those of lithium, potassium, sodium, rubidium, and cesium, with the most preferred salt being that of potassium. According to the process, the alkali metal salt of the starting benzene carboxylic acid is transformed in good yield to the corresponding alkali metal salt of terephthalic acid by heating to a high temperature in a substantially oxygen-free inert atmosphere. Benzene is also obtained as a by-product when the starting material is a salt of benzoic acid. The reaction temperature can vary from about 300° C. up to the decomposition temperature of the starting material or the desired reaction product but preferably is within the range of 340° C. to 500° C. The reaction can be carried out at any convenient pressure although a superatmospheric pressure is preferred. It is also preferred to carry out the reaction in the presence of zinc or cadmium, or a compound thereof, to act as a catalyst and promote a higher yield of the desired dialkali metal terephthalate. The substantially oxygen-free inert atmosphere for the reaction is achieved by the employment of an inert gas such as carbon dioxide, nitrogen, argon, ammonia, methane, carbon monoxide, or the like as an atmosphere for the reaction.

The present invention relates to an improvement in the aforesaid process for the manufacture of terephthalic acid, this improvement involving a specified pretreatment of the reactants. In accordance with the invention, it has been found that in the manufacture of dialkali metal terephthalate wherein an alkali metal salt of a benzene carboxylic acid other than terephthalic acid is heated to an elevated temperature in a substantially oxygen-free inert atmosphere, an improved yield is realized by subjecting said alkali metal salt, prior to heating to reaction temperature, to a subatmospheric pressure in the presence of a substantially oxygen-free inert atmosphere.

For purposes of convenience, the act of subjecting the alkali metal salt of a benzene carboxylic acid other than terephthalic acid to a subatmospheric pressure in the presence of a substantially oxygen-free inert atmosphere is termed "degassing."

The following examples are presented as illustrative of preferred embodiments of the invention. Parts and percentages in the examples and elsewhere in the specification are by weight unless otherwise specified.

Example 1

In a pebble mill there was mixed 50 parts of potassium benzoate and 1.2 parts of cadmium chloride and the resulting mixture was then placed in a stainless steel pressure reaction vessel and degassed. To accomplish degassing, the reaction vessel was flushed and pressured to 150 p. s. i. g. with nitrogen after which the vessel was bled to atmospheric pressure and next evacuated to an ultimate pressure of 1 mm. Hg. The pressuring of the reaction vessel with nitrogen and subsequent evacuation was repeated three times before finally pressuring the vessel to 150 p. s. i. g. with nitrogen and then heating the vessel and its contents to a temperature of 440° C. The reaction temperature was maintained at 440° C. for one hour, while maintaining the vessel sealed, during which time the pressure rose to 500–600 p. s. i. g. The vessel was then cooled to 150° C. and the pressure released through a trap system to condense and collect benzene. Analysis of the reaction product revealed that 98% of the potassium benzoate had reacted and that the yield of dipotassium terephthalate, based on the amount of potassium benzoate reacted, was 85%.

Example 2

A reaction was carried out identically as in Example 1 except that the reactant was not degassed. In other words, after the reaction mixture had been placed in the reaction vessel, the vessel was pressured to 150 p. s. i. g. with nitrogen and then heated to a temperature of 440° C. for one hour while maintaining the vessel sealed. Analysis of the reaction product revealed that 96% of the potassium benzoate had reacted and that the yield of dipotassium terephthalate, based on the amount of potassium benzoate reacted, was 52%.

Example 3

The reaction was carried out exactly as in Example 1 except that argon was substituted for nitrogen both in the degassing of the reaction mixture and during the reaction. Analysis of the reaction product revealed that 97% of the potassium benzoate had reacted and that the yield of dipotassium terephthalate, based on the amount of potassium benzoate reacted, was 84%.

Example 4

The procedure of Example 3 was followed exactly except that the reaction mixture was not degassed. Instead, the reaction vessel was pressured to 150 p. s. i. g. with argon and heated directly to the reaction temperature of 440° C. In this example, the amount of potassium benzoate reacted was 95% and the yield of terephthalic acid, based on the amount of potassium benzoate reacted, was 55%.

The preceding examples show that the degassing of the reaction mixture had a very beneficial effect and that appreciably higher yields of dialkali metal terephthalate were obtained as a result of degassing.

As the preceding description and examples have shown, the present invention relates particularly to a method of pretreating the reactant, or a mixture of reactants if such is used, in the aforesaid prior art process for the manufacture of terephthalic acid. For purposes of convenience, the pretreatment has been termed "degassing" but more adequately described comprises subjecting the reactant, before heating to a temperature at which the reactant is converted to dialkali metal terephthalate, to a subatmospheric pressure in the presence of a substantially oxygen-free inert atmosphere.

While it has been shown that the pretreatment prescribed by the invention is advantageous in enabling one to achieve higher yields of dialkali metal terephthlate, the reasons why such pretreatment provides this advantage are at present unknown and efforts to ascertain the reasons have been unsuccessful. For example, it was suspected, when the invention was first discovered, that degassing was beneficial because it removed from the reactant small quantities of oxygen or water which might be detrimental to the reaction. However, later evidence contradicted this suspicion because the deliberate introduction of small quantities of water and oxygen after degassing did not adversely affect the reaction.

Describing the invention in more detail, the pretreatment of the invention is most conveniently carried out by placing the reactant, i. e., an alkali metal salt of a benzene carboxylic acid other than terephthalic acid, admixed with a catalyst if desired, in a closed vessel, displacing the air in the vessel with a substantially oxygen-free inert atmosphere and then evacuating the vessel to a subatmospheric pressure. While one pretreatment such as described is sufficient to bring about the advantages of the invention, in actual practice the pretreatment is preferably repeated one or more additional times in order to obtain the optimum benefit of the invention. It is understood, of course, that the pretreatment is applied before the reactant has been heated to a temperature at which it is converted to dialkali metal terephthalate, i. e., about 300° C. or higher.

The conditions of the pretreatment with respect to pressure and time are quite widely variable. The pretreatment is effective, for instance, when it is carried out for any finite period of time, i. e., time does not appear to be a variable which affects the efficacy of the pretreatment. On the other hand, the value of the pretreatment does depend on pressure, i. e., the lower the pressure the greater the benefit derived from the pretreatment. Pressures only very slightly below atmospheric, for example, give no measurable benefit so it is therefore preferred to employ a pressure substantially below atmospheric. For practical purposes the pressure should be less than about 100 millimeters of mercury.

It is implicit from the foregoing explanation that the reactant, after it has been subjected to the pretreatment, must be maintained in a substantially oxygen-free inert atmosphere during the interval between the pretreatment and the conversion of the reactant into dialkali metal terephthalate. In practice, this is normally assured by conducting the reaction in the same vessel in which the pretreatment was carried out simply by heating the reactant and increasing the pressure (by introduction of a substantially oxygen-free inert atmosphere) to whatever might be desired for effecting the desired conversion.

Having described in detail the pretreatment to which the invention specifically pertains, it is to be understood that the pretreatment is applicable to any alkali metal salt of a benzene carboxylic acid other than terephthalic acid, e. g., cesium, rubidium, lithium, sodium or potassium salts of benzoic, phthalic, isophthalic, or trimesic acid.

What I claim and desire to protect by Letters Patent is:

1. In the manufacture of dialkali metal terephthalate wherein an alkali metal salt of benzoic acid is heated to an elevated temperature in a substantially oxygen-free inert atmosphere, the improvement which comprises pretreating said alkali metal salt by subjecting it to a subatmospheric pressure of less than about 100 millimeter of mercury in the presence of a substantially oxygen-free inert atmosphere.

2. The process of claim 1 in which the substantially oxygen-free inert atmosphere is nitrogen.

3. The process of claim 1 in which the substantially oxygen-free inert atmosphere is argon.

4. In the manufacture of dipotassium terephthalate wherein potassium benzoate is heated to an elevated temperature in a substantially oxygen-free inert atmosphere, the improvement which comprises pretreating said potassium salt to a subatmospheric pressure of less than about 100 millimeters of mercury in the presence of a substantially oxygen-free inert atmosphere.

References Cited in the file of this patent

UNITED STATES PATENTS 2,823,229    Raecke                Feb. 11, 1958